United States Patent [19]

Cashwell et al.

[11] 4,349,719
[45] Sep. 14, 1982

[54] APPARATUS FOR LASER PERFORATION OF TRANSPORTED ARTICLES

[75] Inventors: Ernest Cashwell, Richmond; Everett C. Grollimund, Midlothian, both of Va.; Walter W. Duley, King City, Canada; A. Clifton Lilly, Jr., Richmond, Va.; Warren E. Claflin, Bon Air, Va.; Edward B. Stultz; Peter Martin, both of Richmond, Va.

[73] Assignee: Philip Morris Incorporated, New York, N.Y.

[21] Appl. No.: 159,593

[22] Filed: Jun. 16, 1980

Related U.S. Application Data

[63] Continuation of Ser. No. 908,523, May 22, 1978.

[51] Int. Cl.³ .................................................. B23K 27/00
[52] U.S. Cl. .................... 219/121 LK; 219/121 LT; 219/121 LY; 219/121 LP; 219/121 FS
[58] Field of Search ............... 219/121 LK, 121 LL, 219/121 FS, 121 L, 121 LM, 121 LP, 121 LT, 121 LY

[56] References Cited

U.S. PATENT DOCUMENTS

| | | | |
|---|---|---|---|
| 3,154,370 | 10/1964 | Johnson | 346/108 |
| 3,256,524 | 6/1966 | Stauffer | 346/76 |
| 3,524,046 | 8/1970 | Brouwer | 219/121 FS X |
| 3,622,740 | 11/1971 | Ravassin et al. | 219/121 L |
| 3,622,742 | 11/1971 | Cohen et al. | 219/121 L |
| 3,742,183 | 6/1973 | Castro et al. | 219/121 L |
| 3,808,394 | 4/1974 | Mominee et al. | 219/121 LM |
| 3,826,578 | 7/1974 | King et al. | 356/237 |
| 3,865,564 | 2/1975 | Jaeger et al. | 219/121 L X |
| 3,866,398 | 2/1975 | Vernon, Jr. et al. | 156/17 |
| 3,943,324 | 3/1976 | Haggerty | 219/121 L |
| 4,027,137 | 5/1977 | Liedtke | 219/121 L |
| 4,063,064 | 12/1977 | Saunders et al. | 219/121 L |
| 4,083,629 | 4/1978 | Kocher et al. | 350/285 |
| 4,118,619 | 10/1978 | McArthur et al. | 219/121 L |
| 4,121,595 | 10/1978 | Heitmann et al. | 219/121 EH X |

FOREIGN PATENT DOCUMENTS

| | | |
|---|---|---|
| 2740755 | 4/1978 | Fed. Rep. of Germany ...... 219/121 LM |
| 2828754 | 6/1978 | Fed. Rep. of Germany . |
| 2754104 | 12/1977 | Fed. Rep. of Germany . |
| 2320918 | 3/1977 | France . |
| 2379992 | 9/1978 | France . |
| 2399374 | 3/1979 | France . |
| 51-134996 | 11/1976 | Japan . |
| 2015813A | 9/1979 | United Kingdom . |
| 242803 | 12/1971 | U.S.S.R. ................ 219/121 L |
| 392318 | 12/1973 | U.S.S.R. ................ 219/121 L |

OTHER PUBLICATIONS

Seebe, "Light Scanners", *IBM Technical Disclosure Bulletin*, vol. 16, No. 6 (1973), pp. 1964–1965.

*Primary Examiner*—C. L. Albritton

[57] ABSTRACT

Perforations are made at locations spaced about the periphery of a cigarette by conducting separate parts of a laser beam through respective separate light paths which intersect such spaced peripheral locations.

11 Claims, 9 Drawing Figures

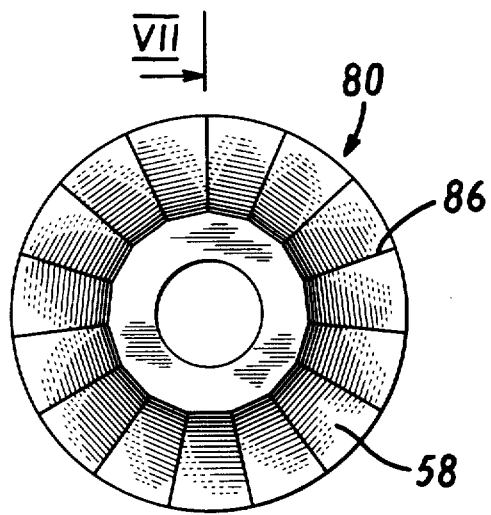
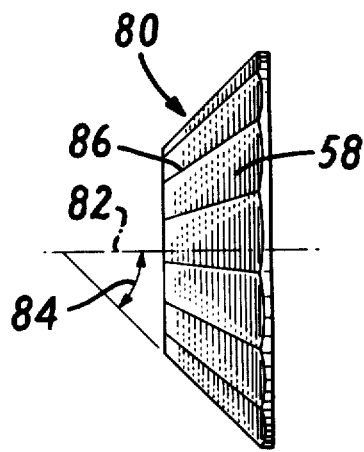
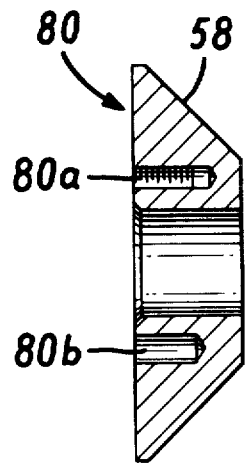
FIG. 5    FIG. 6    FIG. 7
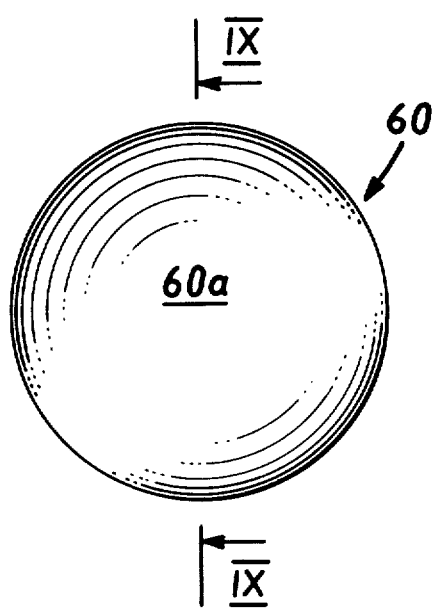
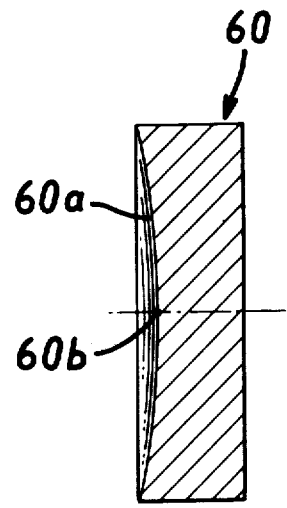
FIG. 8    FIG. 9

APPARATUS FOR LASER PERFORATION OF TRANSPORTED ARTICLES

This is a continuation of application Ser. No. 908,523, filed May 22, 1978.

FIELD OF THE INVENTION

This invention relates to methods and apparatus for perforation of the surface of articles and pertains more particularly to the manufacture of cigarettes having dilution characteristics attained by perforation of filter tipping paper using laser apparatus.

BACKGROUND OF THE INVENTION

Practices examined heretofore in the cigarette industry for perforation have included mechanical puncture, electrical are striking and laser beam treatment. These practices typically have involved perforating a web of filter tipping paper with smoke dilution thereby being effected in the cigarette filter, upon wrapping the perforated tipping paper on filter plugs.

For operation on the assembled filter cigarette, i.e., where perforations are to be made in the tipping paper after wrapping thereof upon the plug and following joinder of the tobacco cylinder and plug, the laser approach is more expeditious than the other foregoing practices. One known system for this purpose continuously rotates an otherwise complete cigarette in relation to a pulsed point-focused laser beam. On each pulse, a single hole is made in the cigarette filter. After completion of rotation, the cigarette bears a plurality of circumferentially spaced holes at a common location axially on the cylindrical plug. Since cigarettes are made back-to-back in such known system and then mutually severed midway of the dual filter plug, the laser beam is split into two beams which are incident on mutually spaced axial locations on the dual plug.

Such known laser approach has advantage in not requiring perforation of tipping paper as a practice preparatory to cigarette making and further in providing possible selection of dilution characteristics optionally at the cigarette maker on otherwise complete cigarettes by adjustment of laser apparatus operation, as contrasted with need for preselection of properly perforated tipping paper for each diverse-dilution cigarette. On the other hand, such known laser-perforation system requires that each cigarette to be perforated be subjected to a full revolution about its longitudinal axis while such axis is in spatially fixed disposition. In the known system, this relatively complex task is practiced by capturing each cigarette separately between first and second drums in a recess extending about the first drum surface and rotating the drums at identical lineal surface speed.

In effect, this known system functions, for each perforation made, in related manner to the several laser sheet material perforating systems shown in the reference discussed in the prior art statement filed herein pursuant to 37 CFR 1.97 and 1.98.

CROSS-REFERENCE TO RELATED APPLICATIONS

The invention, as described below, is claimed in its several different aspects in this application and two other commonly assigned applications filed on even date herewith and respectively entitled "Method and Apparatus for Perforating Articles by Laser", which issued as U.S. Pat. No. 4,224,497 on Sept. 23, 1980, and "Apparatus for Perforating Articles by Laser" which issued as U.S. Pat. No. 4,224,498 on Sept. 23, 1980.

SUMMARY OF THE INVENTION

It is an object of the present invention to provide improved methods and apparatus for laser perforation of articles of manufacture.

A more particular object of the invention is to enable expeditious laser perforation of the periphery of otherwise complete filter cigarettes.

In attaining the foregoing and other objects, the invention provides practice wherein a plurality of circumferentially spaced holes are made simultaneously, by laser treatment of a cigarette, while the cigarette is in essentially single angular disposition with respect to its longitudinal axis. The invention provides apparatus having components for conducting light energy simultaneously to spaced circumferential locations on a cigarette in the course of transport thereof through a cigarette assembly unit. Apparatus in accordance with the invention preferably includes a pulsed laser and optical structure receiving the laser output pulse and simultaneously conducting separate parts thereof in different light paths which intersect diverse locations spaced about the periphery of a cigarette. The system for transporting cigarettes includes a rotative drum which supports cigarettes for perforation and provides for synchronism between drum rotation and laser pulsing. By such practice and apparatus, the cigarette maker may operate with benefit of the invention without change in the production efficiency attained in conventional operation thereof, requiring at most the addition to the assembly unit of exit structure transferring cigarettes with filter portions thereof circumferentially exposed for laser perforation.

The foregoing and other objects and features of the invention will be further understood from the following detailed description of preferred practices and embodiments thereof and from the drawings wherein like reference numerals identify like parts throughout.

DESCRIPTION OF THE DRAWINGS

FIG. 5 is a front elevational view of the hub reflector unit of FIG. 4.

FIG. 6 is a side elevational view of the FIG. 5 unit.

FIG. 7 is a sectional view as seen along line VII—VII of FIG. 5.

FIG. 8 is a front elevational view of a spherical reflector of the FIG. 3 perforating optics.

FIG. 9 is a sectional view as seen along line IX—IX of FIG. 8.

DESCRIPTION OF PREFERRED PRACTICES AND EMBODIMENTS

Figure 1:
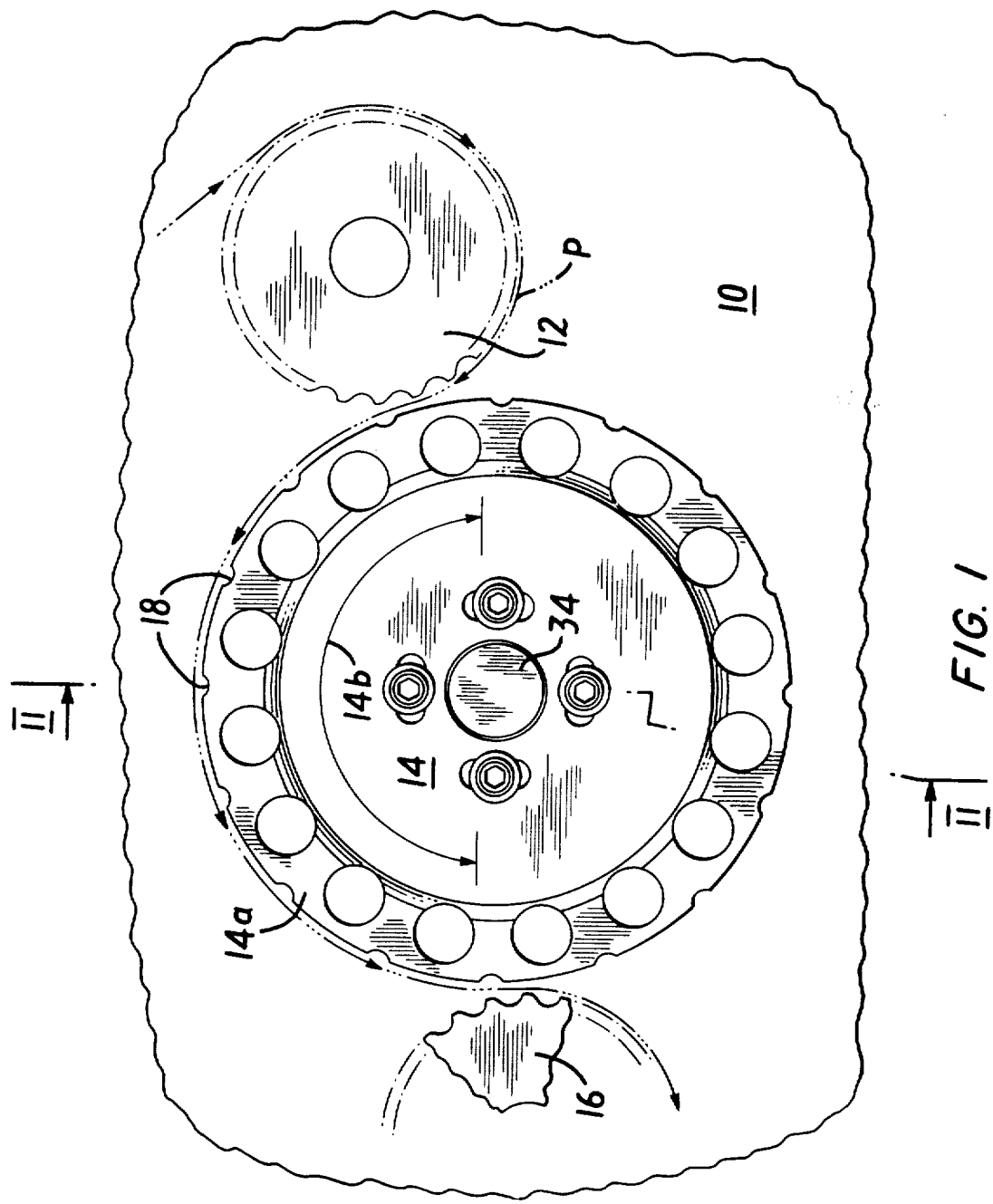
FIG. 1 is a front elevation illustrating transport apparatus for filter cigarettes.
Figure 2:
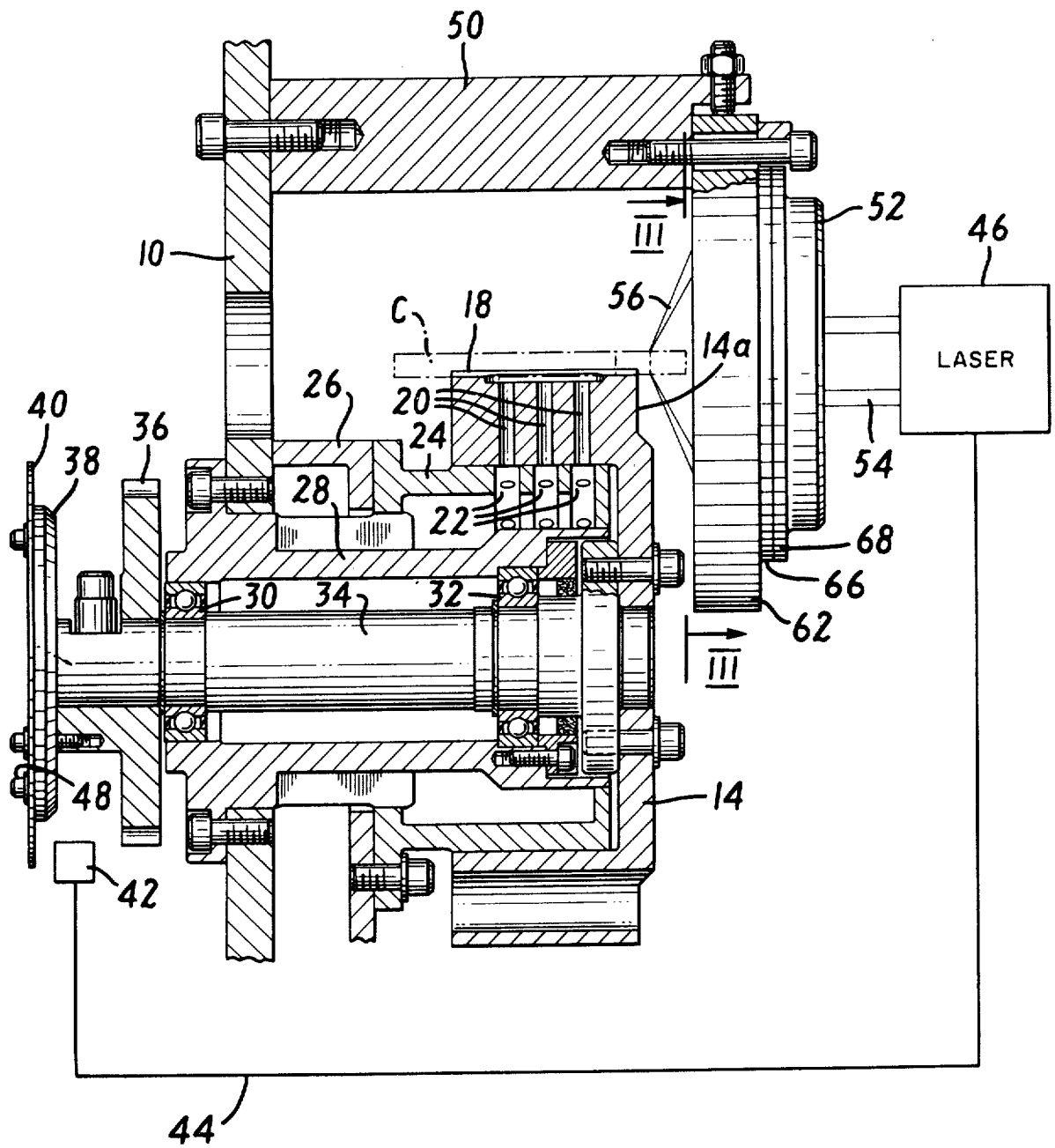
FIG. 2 is a sectional view as seen from plane II—II of FIG. 1 and including a showing of additional components of the system of the invention.

Referring to FIGS. 1 and 2, main frame 10 of a cigarette maker supports ejection drum 12, perforation support drum 14 and transfer drum 16. The path P of cigarettes issued by the maker and traversing the drums is indicated by the broken arrow line, perforated cigarettes being transferred from drum 16 to an output belt conveyor (not shown).

Drum 14 has spaced peripheral grooves 18 running axially thereof, cigarettes C shown in phantom in FIG. 2, being supported in the grooves with the filter tip portion extending outwardly of drum face 14a. Ducts 20 extend, in sets of three as shown, from the floor of grooves 18 through drum 14 and in registry with counterpart fluid passages 22, peripherally continuous over drum portion 14b and extending to the interior of vacuum shoe 24. Shoe 24 is secured to manifold 26 and is in fluid communication therewith. By negative pressurization of manifold 26, suction capture of cigarettes C is effected in travel thereof over path P in FIG. 1.

Housing 28 supports shoe 24 and manifold 26 and seats bearings 30 and 32. Shaft 34 is thus supported for rotation of drum 14 by driving of gear 36. Hub 38 and timing disc 40 are rotative with drum 14, disc 40 having a crenelated periphery, individual radial lugs thereof corresponding in number with the number of grooves 18. Each lug activates Hall-effect switch 42 on passage through the field of sensitivity of the switch, providing an electrical pulse output on line 44. Such pulses are coupled to laser 46 for short duration energization thereof. Hub 38 includes sectoral slots for receipt of screws 48, whereby timing disc 40 may be rotated into desired position for synchronizing operation of the laser with shaft 34 angular position.

Upwardly of drum 14, main frame 10 has secured thereto mounting 50. The mounting in turn supports perforation optics assembly 52, the structural detail of which is discussed below. On each pulsing, laser 46 issues its output beam 54 to assembly 52 which processes the beam to issue perforating beams 56 onto the periphery of the cigarette disposed in position shown in FIG. 1. Perforation of the cigarette filter is thus achieved simultaneously as to all perforations while the cigarette is in essentially single angular disposition with respect to its longitudinal axis. Since drum 14 preferably rotates continuously during operation of the system, the cigarette is transported in path P during perforation by some actual measure, despite that it is maintained by vacuum in fixed position in the drum groove. Shortening of the duration of the laser pulse will, however, effectively "stop" the cigarette, i.e., there is no practical measure of transport during perforation. On the other hand, the invention contemplates variation of dilution characteristics by permitting a practical measure of transport during perforation, by lengthening perforations as the cigarette is moved in path P during laser pulsing. An alternative dilution control measure is to modify beam energy.

In practice of the invention, laser 46 is preferably a TEA (transverse excited atmospheric) $CO_2$ Laser, such as a Series TE-801A Line Tunable Multigas Laser, produced commercially by Lumonics Research Limited, Ontario, Canada. Such laser provides a large diameter beam of high intensity and short duration and is readily pulsed at rates corresponding to rotational transport speeds of drum 14.

Figure 4:
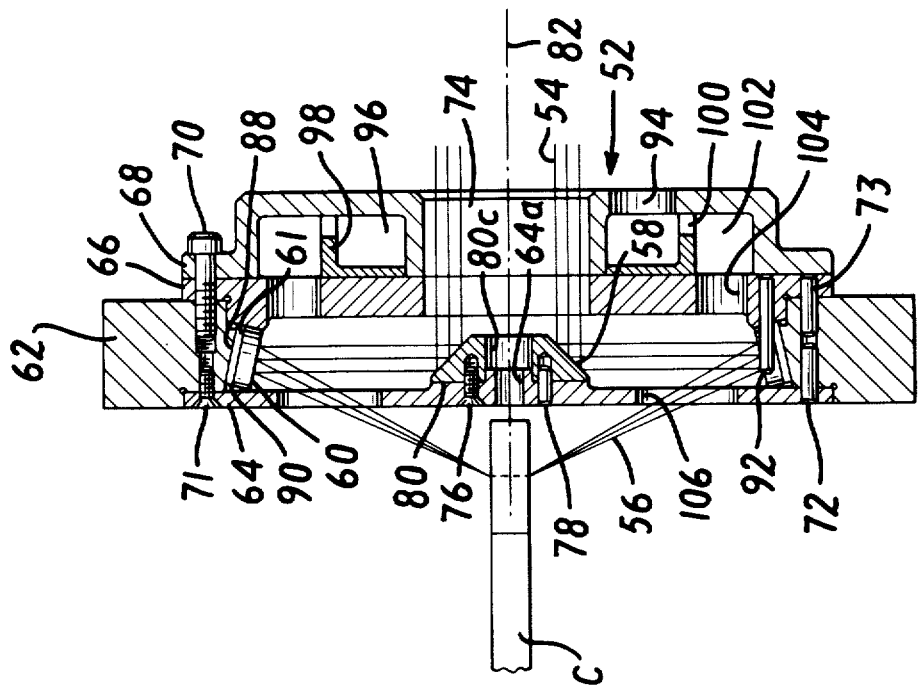
FIG. 4 is a sectional view as seen alor $_k$ line IV—IV of FIG. 3.
Figure 3:
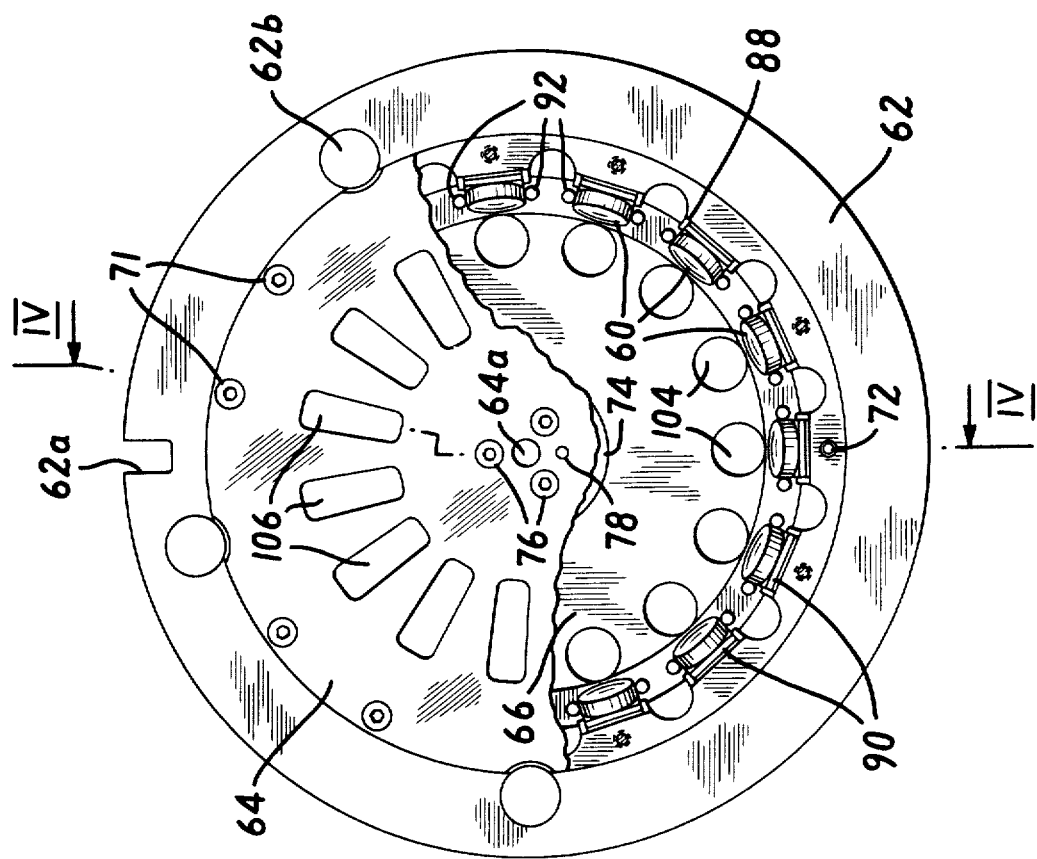
FIG. 3 is an elevational view of the perforating optics of FIG. 2 as seen from plane III—III of FIG. 2.

In adapting laser apparatus to the perforation of cigarettes in manner not requiring rotation of individual cigarettes about their axes throughout perforation thereof, and permitting operational speed consistent with customary cigarette making speeds, applicants preferably employ perforation optics 52 as shown in FIGS. 3 and 4. Principal optical components of the perforation optics are reflective elements 58 and 60 which are supported successively between the laser light-issuing location and the cigarette perforating location. Such elements are operative in conjunction to separate received light energy into discrete parts and to focus each such discrete part for incidence thereof on a distinct one of a plurality of locations about the periphery of the cigarette.

In FIGS. 3 and 4, the perforation optics housing is comprised of support ring 62, back plate 64, front plate 66 and manifold 68. Support ring 62 includes keyway 62a and bores 62b for securement to parent support structure (mounting 50) and has further bores therethrough for receipt of interiorly threaded bolts 70, counterpart flat head fasteners 71 and dowels 72, 73 with attendant securement of the back plate, front plate and manifold to the support ring.

Manifold 68 and front plate 66 both have central openings registering with one another to define housing light admission port 74. Back plate 64 has secured centrally thereto, by flat head fasteners 76 and dowel 78, hub reflector unit 80. Unit 80 is centered about optical axis 82 of admission port 74 and provides an angular succession about axis 82 of plane reflectors, shown in FIG. 5 as light-reflective elements 58. These elements are preferably integral with hub unit 80, comprising facets formed contiguously with one another. Sharp edges are maintained at intersections 86 of adjacent facets and the facets form angle 84 (FIG. 6) with axis 82, desirably forty-five degrees held to plus/minus ten minutes of arc. As shown in FIG. 7, hub unit 80 includes holes 80a and 80b extending partially therethrough for receipt of fasteners 76 and 78 (FIG. 4).

Support ring 62 defines circumferentially spaced lands 88 (FIG. 4) which are inclined with respect to axis 82 at such angle as to provide for axial alignment and the focusing of energy received by spherical reflector elements 60 onto cigarette C. Reflective elements 60 are preferably secured to lands 88 by a suitable cement 90, such as Eastman 910 cement. Dowels 92 are tapped into front plate 66 immediately adjacent each reflective element 60 to further secure the elements in focusing position. Reflective elements 58 and 60 are employed in counterpart pairs, i.e., each reflective element 58 communicates with a single one of reflective elements 60, the two communicating reflective elements comprising a successive pair of reflectors in a single light path extending to a distinct one of the peripheral locations on cigarette C to be perforated. Plane elements 58 serve to separate incoming light energy into separate parts, each part being focused by its counterpart spherical reflective element 60. While reflective elements 60 are mutually contiguous, reflective elements 58 are disposed in angularly successive spaced disposition about axis 82. In the illustrated example, fifteen facets of hub unit 80 are employed with fifteen spherical reflective elements, the latter elements being spaced from one another by twenty-four degrees of arc. Fifteen perforations are accordingly made about the periphery of cigarette C at like twenty-four degree peripheral spacing.

Referring to FIGS. 8 and 9, each spherical reflective element 60 is preferably formed, as in the case of hub unit 80, from a solid body of high purity OFHC (oxygen-free high thermal conductivity) copper. Element 60 exhibits a frontal surface 60a having a common spherical radius over its entirety with its depth of solid body extending beyond the base point 60b of the spherical radius being of dimension controlled to effect proper focusing of received light energy. The reflective surfaces of both of elements 58 and 60 preferably have a protective coating applied thereto. Shims 61 (FIG. 4) may be employed as needed for maximizing energy transfer to cigarette C, as by assisting focusing.

In rendering the apparatus thus far described more suitable for the industrial environment of cigarette perforation, or in like perforation involving the effective conversion of paper to a particulate cloud, pressurized gas is introduced, during use of the perforating optics of FIGS. 3 and 4, into air inlet port 94. An annular channel 96 between manifold 68 and baffle 98 conducts pressurized air to interior ports 100 in respective gas communication with a second annular channel 102 of manifold 68 which, in turn, issues pressurized air through channels 104 formed in front plate 66, each channel being adjacent to one of the spherical reflective elements 60. Pressurized gas is thereby forcibly issued across the spherical reflective elements to effect cleaning thereof.

To provide for essentially uniform volume flow of pressurized air from each of interior ports 100, the size of the ports is increased with increasing distance thereof from air inlet port 94.

Back plate 64 (FIG. 3) is a solid member except for window cutouts 106 formed therein at locations in registry with the light paths extending from reflective elements 60 to cigarette C. By this preferred configuration of back plate 64, a sufficient back pressure is applied by the back plate member on introduced pressurized gas as to cause flow thereof also across the surfaces of reflective elements 58 with window 74 then serving as an exhaust port for such pressurized gas.

Unit 80 is shown with bore 80c (FIG. 4), enlarged in diameter from bore 64a formed in the portion of plate 64 immediately supporting unit 80. By this arrangement, a set up and alignment pin (not shown) may be stepped in diameter to fit bore 64a and to otherwise represent cigarette C and reside in perforation drum groove 18 (FIG. 2). Following set up and alignment, the pin is removed and a light energy absorber may be inserted in bore 64a to protect against issuance of the laser output leftwardly of plate 64 in FIG. 4.

In the illustrated practice discussed above, the placement of all reflective elements 58 and all reflective elements 60 in respective common orientations with respect to axis 82 provides for common location axially of the cigarette for all perforations, i.e., the fifteen perforations define a perforated circular band about the cigarette. The invention contemplates such changes in disposition of its optical elements as to arrange for other band configurations as may be desired, e.g., closed or open helical bands, etc. Further, while the use of a pulsed laser has been discussed, the invention contemplates suitable shuttering of a continuous laser synchronously with movememt of articles to perforation position. The laser beam may also be shaped as desired, by masking, internally of the resonant cavity or externally thereof, e.g., to be square or ring-shaped in cross-section. Modification of the preferred optics may of course be made to achieve like definition of separate light conducting paths, with conveyance of essentially focused energy to the article to be perforated, for example, by an arrangement of plural light sources and associated focusing elements in lieu of the preferred single light source described herein.

In the illustrated arrangement, reflector elements 58 are plane and 60 are spherical or aspherical. The elements may conversely be successively spherical (aspherical) and plane in the direction of light energy propagation. In another usable arrangement plane elements may be substituted for reflectors 60 in the illustrated embodiment with a focusing lens in each distinct path, either between successive reflectors or between each output reflector and the cigarette. While the exemplary article has been characterized as cylindrical and peripherally perforated while in single angular disposition about its longitudinal axis, the invention is manifestly used for such peripheral perforation of articles of other than cylindrical shape. These and other changes and variations may evidently be introduced without departing from the invention. The foregoing detailed description accordingly is intended as being illustrative and not limiting of the invention, the true spirit and scope thereof being set forth in the appended claims.

What is claimed is:

1. Apparatus for providing perforations extending through and spaced about the other peripheral surface of a cigarette, said apparatus comprising light energy generator means for generating a light beam, rotative transport means for transporting the cigarette, said rotative transport means contacting the cigarette only at a portion of the cigarette distinct from the portion thereof to be perforated, and optical means for receiving a light beam generated by said light energy generator means, for splitting said light beam reflectively and non-transmissively into a plurality of spatially separated parts, and for conducting said separated parts thereof in respective different light paths intersecting respective different predetermined locations spaced about the outer peripheral surface of the cigarette to perforate the cigarette as said rotative transport means moves the cigarette through a predetermined position.

2. The apparatus claimed in claim 1 wherein said optical means defines said light paths in such a manner as to cause said spatially separated parts to intersect different locations on the portion of a cigarette to be perforated and lying in a plane perpendicular to the longitudinal axis of the cigarette.

3. The apparatus claimed in claim 1 further including a housing having a light admission port means and a light issuance port means, said housing supporting a plurality of first light-reflective elements of said optical means in angularly successive disposition about an optical axis of said light admission port means and in confronting relation thereto and further supporting an equal plurality of second light-reflective elements of said optical means in angularly successive disposition about said optical axis, each said second element being in confronting relation both to a respective one of said first elements and to said light issuance port means.

4. The apparatus claimed in claim 3 wherein said first elements are disposed mutually contiguously and about said optical axis and wherein said second elements are disposed in mutually spaced relation about said optical axis.

5. The apparatus claimed in claim 4 wherein said light issuance port means comprises plate means defining a plurality of light issuance ports, each said issuance port being in registry with a respective one of said second elements.

6. The apparatus claimed in claim 1 further including a housing having a light admission port and having a respective light issuance port in registry with each of said light paths, said housing supporting light-reflective elements of said optical means in said light paths, said housing including means for receiving pressurized gas and for applying such received gas onto surfaces of said reflective elements to clean said reflective elements.

7. The apparatus claimed in claim 1 wherein said light energy generator means comprises a laser.

8. The apparatus claimed in claim 7 wherein said laser is a transverse excited atmospheric laser.

9. The apparatus claimed in claim 1 further including sensor means for generating an output signal when said rotative transport means is at such an angular position that a cigarette being transported by said rotative transport means is passing through said predetermined position, and means for applying said output signal to said light energy generator means for causing the generation of a pulse of light energy thereby.

10. The apparatus claimed in claim 1, wherein said optical means is for splitting said light beam into at least ten spatially separated parts.

11. The apparatus claimed in claim 1, wherein said optical means is further for causing said spatially separated parts of said light beam to strike the outer peripheral surface of a cigarette simulataneously when such cigarette is moving through said predetermined position.

* * * * *